(12) United States Patent
Oh et al.

(10) Patent No.: US 11,110,772 B2
(45) Date of Patent: Sep. 7, 2021

(54) THERMAL MANAGEMENT SYSTEM FOR VEHICLE

(71) Applicants: Hyundai Motor Company, Seoul (KR); Kia Motors Corporation, Seoul (KR)

(72) Inventors: Man Ju Oh, Yongin-si (KR); So La Chung, Seoul (KR); Jae Woong Kim, Hwaseong-si (KR); Sang Shin Lee, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 169 days.

(21) Appl. No.: 16/682,213

(22) Filed: Nov. 13, 2019

(65) Prior Publication Data
US 2020/0384827 A1 Dec. 10, 2020

(30) Foreign Application Priority Data
Jun. 4, 2019 (KR) .................. 10-2019-0066225

(51) Int. Cl.
*B60H 1/00* (2006.01)
*B60H 1/03* (2006.01)
(Continued)

(52) U.S. Cl.
CPC ..... *B60H 1/00278* (2013.01); *B60H 1/00342* (2013.01); *B60H 1/00392* (2013.01); *B60H 1/00428* (2013.01); *B60H 1/03* (2013.01); *B60H 1/143* (2013.01); *B60H 1/3208* (2013.01); *B60H 1/3211* (2013.01); *B60H 1/3222* (2013.01);
(Continued)

(58) Field of Classification Search
CPC .......... B60H 1/00278; B60H 1/00342; B60H 1/00392; B60H 1/00428; B60H 1/03; B60H 1/143; B60H 1/32281; B60H 1/3208; B60H 1/3211; B60H 1/3222; B60H 2001/2228; B60H 2001/3267
See application file for complete search history.

(56) References Cited

U.S. PATENT DOCUMENTS

2013/0053194 A1  2/2013  Yokoyama
2013/0056194 A1  3/2013  Cregut et al.
(Continued)

FOREIGN PATENT DOCUMENTS

KR    10-1448656 B1    10/2014

*Primary Examiner* — Marc E Norman
(74) *Attorney, Agent, or Firm* — Morgan, Lewis & Bockius LLP (57) ABSTRACT

A thermal management system for a vehicle is provided, which includes a battery line connected to a high-voltage battery core, provided with a first radiator, and configured to make cooling water flow therein by a first pump; an indoor heating line connected to a heating core for indoor air conditioning, and provided with a water heating heater therein and a second pump to make cooling water flow therein; a first battery heating line and a second battery heating line branched from a first valve provided at a downstream point of the heating core of the indoor heating line and connected to upstream and downstream points of the high-voltage battery core of the battery line, respectively; and a refrigerant line provided with an expansion valve, a cooling core for indoor air conditioning, a compressor, and an air-cooled condenser.

18 Claims, 7 Drawing Sheets

(51) Int. Cl.
*B60H 1/32* (2006.01)
*B60H 1/14* (2006.01)
*B60H 1/22* (2006.01)

(52) U.S. Cl.
CPC . *B60H 1/32281* (2019.05); *B60H 2001/2228* (2013.01); *B60H 2001/3267* (2013.01)

(56) References Cited

U.S. PATENT DOCUMENTS

| | | | |
|---|---|---|---|
| 2020/0101816 A1* | 4/2020 | Takagi | B60H 1/00885 |
| 2020/0269724 A1* | 8/2020 | Takazawa | B60K 6/24 |
| 2020/0346523 A1* | 11/2020 | Oh | B60H 1/143 |
| 2020/0353796 A1* | 11/2020 | Oh | B60H 1/00485 |
| 2020/0391570 A1 | 12/2020 | Lee et al. | |

* cited by examiner

THERMAL MANAGEMENT SYSTEM FOR VEHICLE

CROSS REFERENCE TO RELATED APPLICATION

The present application claims priority to Korean Patent Application No. 10-2019-0066225 filed on Jun. 4, 2019, the entire contents of which is incorporated herein for all purposes by this reference.

BACKGROUND OF THE INVENTION

Field of the Invention

The present invention relates to a thermal management system for a vehicle, which can efficiently manage energy which is necessary for indoor air conditioning, cooling of electronic components, or heating and cooling of a battery in a thermal management field for a vehicle.

Description of Related Art

Recently, an electric vehicle is on the rise as social issues to implement eco-friendly technologies and to solve problems, such as energy exhaustion. The electric vehicle operates using a motor which is supplied with electricity from a battery and outputs power. Accordingly, the electric vehicle has advantages that it does not exhaust carbon dioxide, it generates very small noise, and energy efficiency of the motor is higher than that of an engine, and thus the electric vehicle has been spotlighted as an eco-friendly vehicle.

In implementing such an electric vehicle, the core technology is related to a battery module, and recently, researches for lightweight, miniaturization, and short charging time of a battery has been actively made. To maintain the optimum performance and long lifespan, it is required for the battery module to be used in an optimum temperature environment. However, due to heat generation during operation and external temperature change, it is difficult to use the battery module in such an optimum temperature environment.

Furthermore, the electric vehicle does not have the waste heat source which is generated during combustion in a separate engine, such as an internal combustion engine, and an electric heating device provided in the vehicle performs indoor heating in a winter season. Furthermore, because warmup is necessary to improve charging and discharging performances of the battery in the coldest season, a separate cooling-water heating type electric heater may be provided to be used. That is, to maintain an optimum temperature environment of the battery module, a technology is adopted to operate a heating and cooling system for temperature adjustment of the battery module separately from the heating and cooling system for vehicle indoor air conditioning. In other words, two independent heating and cooling systems are constructed, and one thereof is used for indoor heating and cooling, while the other is used for the temperature adjustment of the battery module.

However, in the case of operation in the above-described method, the range is short, and thus long-distance driving is not possible. The driving distance is reduced by 30% or more during cooling in a summer season, and it is reduced by 40% or more during heating in a winter season, resulting in that the winter-season heating problem, which is not caused in the internal combustion engine, becomes severer. If a high-capacity PTC is provided to solve the problem occurring during the heating in the winter season, the driving distance is reduced, and the cost and the weight caused by the use of a heat pump become excessive.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a thermal management system for a vehicle configured for efficiently managing energy which is necessary for indoor air conditioning, cooling of electronic components, or heating and cooling of a battery in a thermal management field for a vehicle.

In various aspects of the present invention, a thermal management system for a vehicle according to an exemplary embodiment of the present invention may include a battery line connected to a high-voltage battery core, provided with a first radiator, and configured to make cooling water flow therein by a first pump; an indoor heating line connected to a heating core for indoor air conditioning, provided with a water heating heater therein, and provided with a second pump to make cooling water flow therein; a first battery heating line and a second battery heating line branched from a first valve provided at a downstream point of the heating core of the indoor heating line and connected to an upstream point and a downstream point of the high-voltage battery core of the battery line, respectively; and a refrigerant line provided with an expansion valve, a cooling core for indoor air conditioning, a compressor, and an air-cooled condenser.

A downstream point of the compressor of the refrigerant line and an upstream point of the water heating heater of the indoor heating line may be connected to each other through a water-cooled condenser, and the refrigerant line and the indoor heating line may be connected to each other to exchange heat with each other through the water-cooled condenser.

The thermal management system may further include an electronic component line connected to an electronic component core, provided with a second radiator, and configured to make the cooling water flow therein by a third pump.

The thermal management system may further include a refrigerant bypass line having one end portion connected to an upstream point of the cooling core for the indoor air conditioning of the refrigerant line, and the other end portion connected between a downstream point of the cooling core for the indoor air conditioning and an upstream point of the compressor of the refrigerant line; and a first cooling water bypass line having one end portion connected to a downstream point of the electronic component core of the electronic component line, and the other end portion connected to an upstream point of the electronic component core of the electronic component line through a second valve, wherein the refrigerant bypass line and the first cooling water bypass line are connected to each other through a chiller, and the refrigerant bypass line and the first cooling water bypass line are connected to each other to exchange heat with each other through the chiller.

In a first mode to increase a temperature of the high-voltage battery core, a controller may be configured to control the water heating heater, the first valve, and the second pump to introduce the cooling water with an increased temperature passing through the water heating heater to the high-voltage battery core through the first battery heating line and then to introduce the cooling water again to the indoor heating line through the second battery heating line.

In a second mode to recover a waste heat of the electronic component core and to increase a temperature of the high-voltage battery core, a controller may be configured to control the compressor, the water heating heater, the first valve, the second valve, the second pump, and the third pump to introduce the cooling water passing through the electronic component core to the chiller through the first cooling water bypass line and then to introduce the cooling water again to the electronic component line, to introduce a refrigerant passing through the air-cooled condenser to the water-cooled condenser through the chiller and then to introduce the refrigerant again to the air-cooled condenser, and to introduce the cooling water with an increased temperature passing through the water heating heater after passing through the water-cooled condenser to the high-voltage battery core through the first battery heating line and then to introduce the cooling water again to the indoor heating line through the second battery heating line.

The thermal management system may further include a second cooling water bypass line having one end portion connected to the upstream point of the high-voltage battery core of the battery line, and the other end portion connected to the downstream point of the high-voltage battery core of the battery line, wherein the second cooling water bypass line is connected to exchange heat with the first cooling water bypass line or the refrigerant bypass line through connection to the chiller.

In a third mode to cool the high-voltage battery core, a controller may be configured to control the compressor, the third valve, and the first pump to introduce a refrigerant passing through the air-cooled condenser to the water-cooled condenser through the chiller and then to introduce the refrigerant again to the air-cooled condenser, and to introduce the cooling water passing through the high-voltage battery core to the chiller through the second cooling water bypass line and then to introduce the cooling water again to the high-voltage battery core.

In a fourth mode to cool the electronic component core and the high-voltage battery core, a controller may be configured to control the compressor, the first valve, the second valve, the third valve, the first pump, and the third pump to introduce a refrigerant passing through the air-cooled condenser to the water-cooled condenser through the chiller and then to introduce the refrigerant again to the air-cooled condenser, to introduce the cooling water passing through the high-voltage battery core to the chiller through the second cooling water bypass line and then to introduce the cooling water again to the high-voltage battery core, and to introduce the cooling water passing through the electronic component core again to the electronic component core after passing through the second radiator.

In a fifth mode to cool the electronic component core and the high-voltage battery core using an outdoor air of the vehicle, a controller may be configured to control the first valve, the second valve, the third valve, the first pump, and the third pump to circulate the cooling water in the battery line and the electronic component line.

The first radiator may be removed from the battery line, and the battery line may be connected to the chiller through the second cooling water bypass line to circulate the cooling water through the first pump.

The first battery heating line may be branched from the first valve provided at the downstream point of the heating core of the indoor heating line and may be connected to the upstream point of the high-voltage battery core of the battery line, the second battery heating line may be branched between the downstream point of the heating core of the indoor heating line and an upstream point of the first valve and may be connected to the downstream point of the high-voltage battery core of the battery line, and the thermal management system may further include a third cooling water bypass line having one end portion connected to the second battery heating line through a fourth valve, and the other end portion connected to the first battery heating line.

According to the thermal management system according to an exemplary embodiment of the present invention, it is possible to efficiently manage energy that is necessary for indoor air conditioning, cooling of electronic components, or heating and cooling of a battery in a thermal management field for a vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 1:
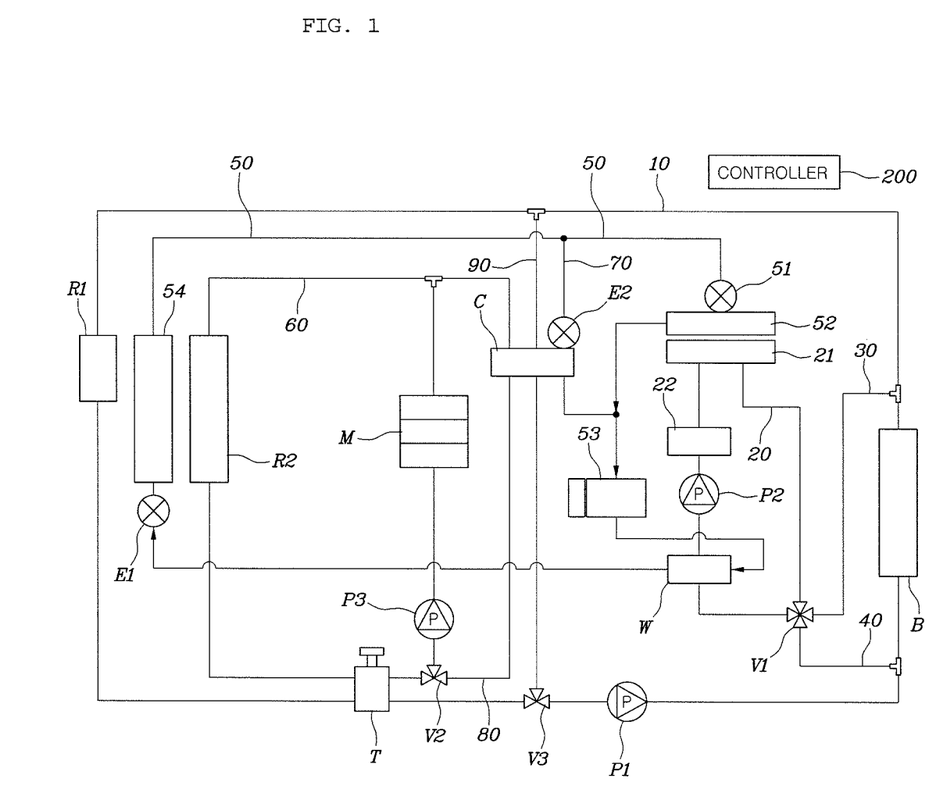
FIG. 1 is a diagram illustrating a thermal management system for a vehicle according to an exemplary embodiment of the present invention.
Figure 6:
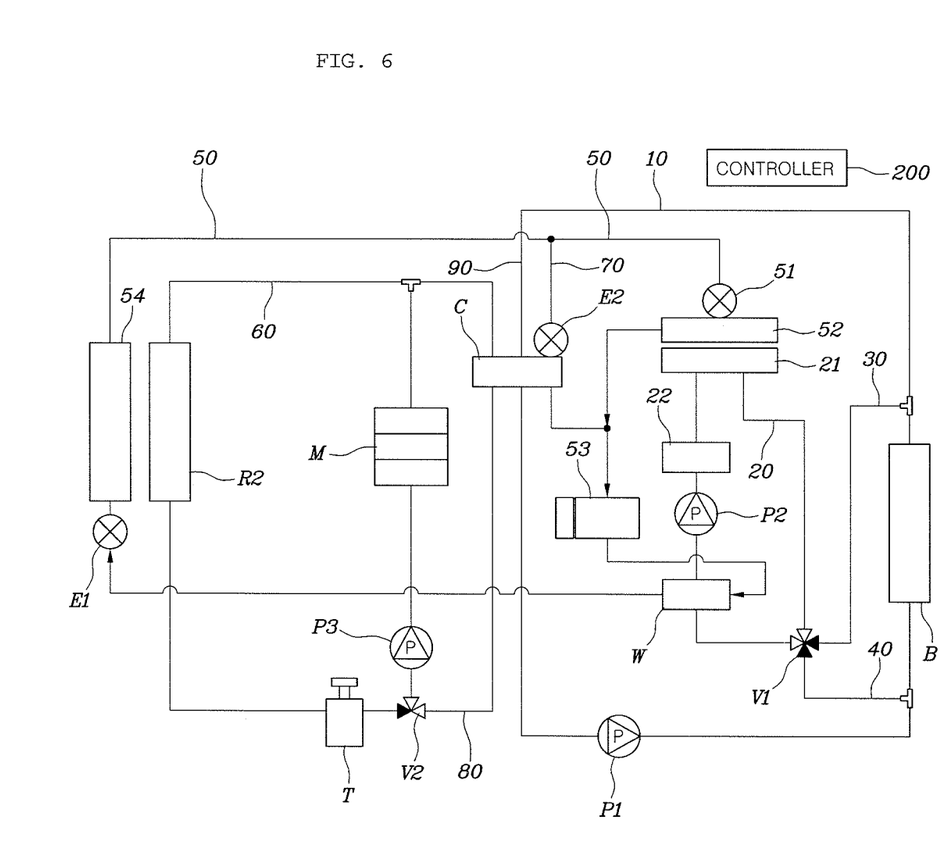
FIG. 6 and FIG. 7 are diagrams illustrating a thermal management system for a vehicle according to various exemplary embodiments of the present invention.
Figure 7:
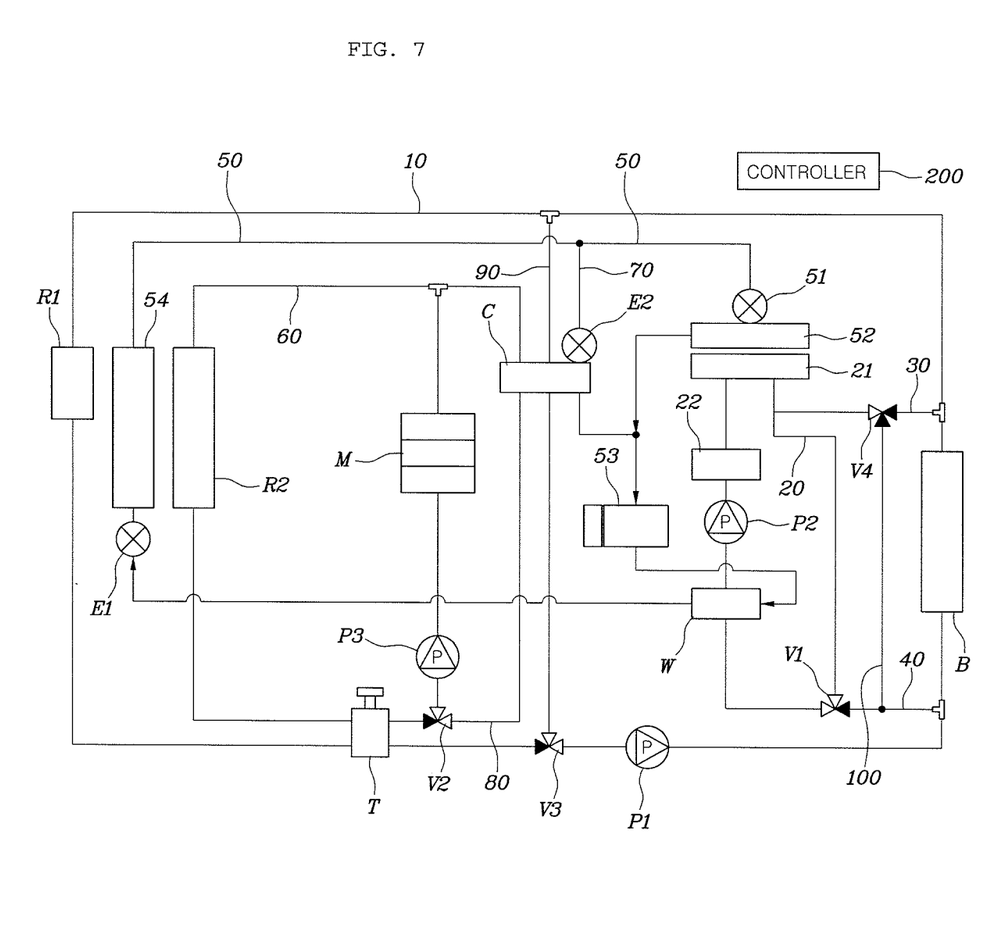

FIG. 1 is a diagram illustrating a thermal management system for a vehicle according to an exemplary embodiment of the present invention, and FIG. 2, FIG. 3, FIG. 4 and FIG. 5 are diagrams explaining circulation of cooling water and a refrigerant in a thermal management system for a vehicle according to an exemplary embodiment of the present invention. FIG. 6 and FIG. 7 are diagrams illustrating a thermal management system for a vehicle according to various exemplary embodiments of the present invention.

According to an exemplary embodiment of the present invention, a controller 200 is provided. The controller 200 according to an exemplary embodiment of the present invention may be implemented by a nonvolatile memory configured to store data about an algorithm configured to control operations of various constituent elements of a vehicle or software instructions to reproduce the algorithm, and a processor configured to perform operations to be described hereinafter using the data stored in the corresponding memory. Here, the memory and the processor may be implemented by separate chips. Alternatively, the memory and the processor may be implemented by a single integrated chip. The processor may be in a form of one or more processors.

The controller 200 controls operations of a first pump P1, a second pump P2, and a third pump P3 to adjust a flow of cooling water on a cooling water line on which the respective pumps are deployed. Furthermore, the controller 200 controls an operation of a compressor 53 of a refrigerant line 50 to adjust a flow of a refrigerant on a refrigerant line 50. First to fourth valves V1 to V4 are controlled by the controller to selectively connect cooling water lines to which the respective valves are connected or to control a flow rate. Furthermore, the respective valves are provided as multi-way valves. Furthermore, an expansion valve 51 is a valve configured to discharge a high-temperature and high-pressure refrigerant to a cooling core 52 for indoor air conditioning. A first expansion valve E1 is a valve configured to discharge the high-temperature and high-pressure refrigerant to an air-cooled condenser 54, and a second expansion valve E2 is a valve configured to discharge the high-temperature and high-pressure refrigerant to a chiller C.

As illustrated in FIG. 1, the thermal management system for a vehicle according to an exemplary embodiment of the present invention includes a battery line 10 connected to a high-voltage battery core B, provided with a first radiator R1, and configured to make cooling water flow therein by the first pump P1; an indoor heating line 20 connected to a heating core 21 for indoor air conditioning, provided with a water heating heater 22 therein, and provided with the second pump P2 to make cooling water flow therein; a first battery heating line 30 and a second battery heating line 40 branched from the first valve V1 provided at a downstream point of the heating core 21 of the indoor heating line 20, and connected to an upstream point and a downstream point of the high-voltage battery core B of the battery line 10, respectively; and the refrigerant line 50 provided with the expansion valve 51, the cooling core 52 for the indoor air conditioning, the compressor 53, and an air-cooled condenser 54.

According to an exemplary embodiment of the present invention, the battery line 10 is provided. The battery line 10 is connected to the high-voltage battery core B. Furthermore, on the battery line 10, the first radiator R1 is provided, and cooling water may flow on the battery line 10 by the first pump P1. On the battery line 10, the high-voltage battery core B is provided, and the first radiator R1 for cooling the high-voltage battery core B using an outdoor air is provided. Furthermore, on the battery line 10, the first pump P1 of which the driving/stopping is controlled by the controller to circulate the cooling water is provided. The high-voltage battery core B may conceptually include both a heat dissipation portion directly connected to a high-voltage battery and a heat dissipation portion indirectly connected to the high-voltage battery through a separate cooling water line. Furthermore, the high-voltage battery core B may be cooled by introducing the cooling water which undergoes heat transfer with an outdoor air of a vehicle by the first radiator R1.

Furthermore, according to an exemplary embodiment of the present invention, the indoor heating line 20 is provided. The indoor heating line 20 is connected to the heating core 21 for the indoor air conditioning. Furthermore, on the indoor heating line 20, the water heating heater 22 for heating the cooling water is provided. Furthermore, on the indoor heating line 20, the second pump P2 of which the driving/stopping is controlled by the controller to circulate the cooling water is provided. Accordingly, the cooling water with an increased temperature passing through the water heating heater 22 exchanges heat with an air passing through the heating core 21 for the indoor air conditioning, and thus the air with an increased temperature that passes through the heating core 21 for the indoor air conditioning may be discharged into an indoor space of the vehicle.

Furthermore, according to an exemplary embodiment of the present invention, the first battery heating line 30 and the second battery heating line 40 are provided. The first battery heating line 30 is branched from the first valve V1 provided at the downstream point of the heating core 21 of the indoor heating line 20, and is connected to the upstream point of the high-voltage battery core B of the battery line 10. Furthermore, the second battery heating line 40 is branched from the first valve V1 provided at the downstream point of the heating core 21 of the indoor heating line 20, and is connected to the downstream point of the high-voltage battery core B of the battery line 10. Accordingly, the cooling water passing through the heating core 21 for the indoor air conditioning is introduced to the battery line 10 through the first battery heating line 30, and then passes through the high-voltage battery core B to exchange heat with the high-voltage battery core B. The cooling water passing through the high-voltage battery core B may be introduced again to the battery line 10 through the second battery heating line 40.

Furthermore, according to an exemplary embodiment of the present invention, the refrigerant line 50 is provided. The refrigerant line 50 is provided with the expansion valve 51, the cooling core 52 for the indoor air conditioning, the compressor 53, and the air-cooled condenser 54. Furthermore, on the refrigerant line 50, the air-cooled condenser 54 for heat-dissipating the refrigerant of the refrigerant line 50 using the outdoor air of the vehicle is provided. Furthermore, on the refrigerant line 50 of the vehicle, the compressor 53 is operated by the controller to circulate the refrigerant, and the circulating refrigerant exchanges heat with the air passing through the cooling core 52 for the indoor air conditioning. Accordingly, the air passing through the cooling core 52 for the indoor air conditioning is cooled, and the cooled air is discharged into the indoor space of the vehicle.

Furthermore, in the case of the thermal management system for a vehicle according to an exemplary embodiment of the present invention as shown in FIG. 1, a downstream point of the compressor 53 of the refrigerant line 50 and an upstream point of the water heating heater 22 of the indoor heating line 20 are connected to each other through a water-cooled condenser W. That is, the refrigerant line 50 and the indoor heating line 20 are thermally connected to each other through the water-cooled condenser W. Accordingly, the refrigerant with an increased temperature that passes through the compressor 53 on the refrigerant line 50 mutually exchanges heat with the cooling water of the indoor heating line 20 in the water-cooled condenser W. Accordingly, the refrigerant of the refrigerant line 50 can increase the temperature of the cooling water of the indoor heating line 20.

On the other hand, the thermal management system for a vehicle according to an exemplary embodiment of the present invention as shown in FIG. 1 may further include an electronic component line 60 connected to an electronic component core, provided with a second radiator R2, and configured to make the cooling water flow therein by the third pump P3. The electronic component core may conceptually include both a heat dissipation portion directly connected to an electronic component and a heat dissipation portion indirectly connected to the electronic component through a separate cooling water line. Furthermore, the cooling water may flow on the electronic component line 60 through the third pump P3 of which the driving/stopping is controlled by the controller. Furthermore, on the electronic component line 60, the second radiator R2 is provided so that the cooling water passing through the second radiator R2 exchanges heat with the outdoor air of the vehicle to be cooled. Accordingly, the second radiator R2 and the electronic component core are connected through the electronic component line 60 to exchange heat with each other.

Furthermore, the thermal management system for a vehicle according to an exemplary embodiment of the present invention as shown in FIG. 1 may further include a refrigerant bypass line 70 having one end portion connected to an upstream point of the cooling core 52 for the indoor air conditioning of the refrigerant line 50 and the other end portion connected between a downstream point of the cooling core 52 for the indoor air conditioning and an upstream point of the compressor 53 of the refrigerant line 50, and a first cooling water bypass line 80 having one end portion connected to a downstream point of the electronic component core of the electronic component line 60 and the other end portion connected to an upstream point of the electronic component core of the electronic component line 60 through the second valve V2. The refrigerant bypass line 70 and the first cooling water bypass line 80 may be connected to each other through the chiller C, and the refrigerant bypass line 70 and the first cooling water bypass line 80 may be connected to each other to exchange heat through the chiller C.

One end portion of the refrigerant bypass line 70 is connected to the upstream point of the cooling core 52 for the indoor air conditioning of the refrigerant line 50, and the other end portion of the refrigerant bypass line 70 is connected between the downstream point of the cooling core 52 for the indoor air conditioning and the upstream point of the compressor 53 of the refrigerant line 50. Furthermore, one end portion of the first cooling water bypass line 80 is connected to the downstream point of the electronic component core of the electronic component line 60, and the other end portion of the first cooling water bypass line 80 is connected to the upstream point of the electronic component core of the electronic component line 60 through the second valve V2. On the other hand, as illustrated, the refrigerant bypass line 70 and the first cooling water bypass line 80 may be connected to each other through the chiller C, and the refrigerant bypass line 70 and the first cooling water bypass line 80 may be connected to each other to exchange heat through the chiller C. That is, because the refrigerant bypass line 70 and the first cooling water bypass line 80 are connected through the chiller C, the refrigerant passing through the refrigerant bypass line 70 is thermally connected to the cooling water passing through the first cooling water bypass line 80.

On the other hand, in a first mode to increase the temperature of the high-voltage battery core B, a controller may be configured to control the water heating heater 22, the first valve V1, and the second pump V2 to introduce the cooling water with an increased temperature passing through the water heating heater 22 to the high-voltage battery core B through the first battery heating line 30 and then to introduce the cooling water again to the indoor heating line 20 through the second battery heating line 40.

Figure 2:
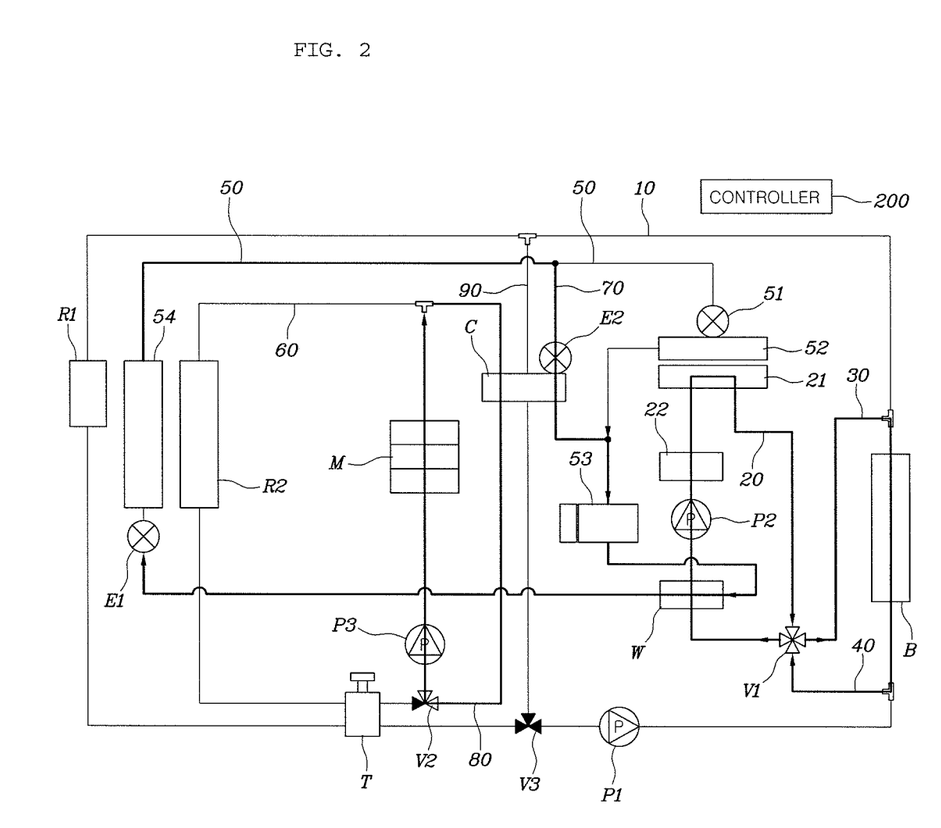
FIG. 2, FIG. 3, FIG. 4 and FIG. 5 are diagrams explaining circulation of cooling water and a refrigerant in a thermal management system for a vehicle according to an exemplary embodiment of the present invention.

With reference to FIG. 2, the controller controls the water heating heater 22, the first valve V1, and the first pump P1. The controller controls the second pump P2 to make the cooling water flow on the indoor heating line 20, and it controls the water heating heater 22 to increase the temperature of the cooling water on the indoor heating line 20. That is, the water heating heater 22 operates to increase the temperature of the cooling water passing through the water heating heater 22. Furthermore, the controller controls the first valve V1 to make the cooling water flow on the first battery heating line 30 and the second battery heating line 40. Accordingly, the cooling water with the increased temperature passing through the water heating heater 22 passes through the heating core 21 for the indoor air conditioning, and then it is introduced to the high-voltage battery core B through the first battery heating line 30. The cooling water being introduced to the high-voltage battery core B is again introduced to the indoor heating line 20 through the second battery heating line 40 to be circulated. Accordingly, the cooling water with the increased temperature passing through the water heating heater 22 can increase the temperature of the high-voltage battery core B. In the instant case, the air with the increased temperature may be discharged into the indoor space of the vehicle using the heating core 21 for the indoor air conditioning. As a result, in the case of the first mode, the temperature of the high-voltage battery core B may be increased using the water heating heater 22, and if necessary, the air with the increased temperature may be discharged into the indoor space of the vehicle.

On the other hand, in a second mode to recover the waste heat of the electronic component core and to increase the temperature of the high-voltage battery core B, the controller may be configured to control the compressor 53, the water heating heater 22, the first valve V1, the second valve V2, the second pump P2, and the third pump P3 to introduce the cooling water passing through the electronic component core to the chiller C through the first cooling water bypass line 80 and then to introduce the cooling water again to the electronic component line, to introduce the refrigerant passing through the air-cooled condenser 54 to the water-cooled condenser W through the chiller C and then to introduce the refrigerant again to the air-cooled condenser, and to introduce the cooling water with the increased temperature passing through the water heating heater 22 after passing through the water-cooled condenser W to the high-voltage battery core B through the first battery heating line 30 and then to introduce the cooling water again to the indoor heating line 20 through the second battery heating line 40.

With reference to FIG. 2, the controller controls the compressor 53, the water heating heater 22, the first valve V1, the second valve V2, the second pump P2, and the third pump P3. That is, the controller controls the second valve V2 and the third pump P3 to introduce the cooling water passing through the electronic component core to the chiller C through the first cooling water bypass line 80, and then to introduce the cooling water again to the electronic component line 60. Furthermore, the controller controls the compressor 53 to introduce the refrigerant passing through the air-cooled condenser 54 to the water-cooled condenser W through the chiller C, and then to introduce the refrigerant again to the air-cooled condenser W. Accordingly, the waste heat of the electronic component is recovered by the cooling water passing through the first cooling water bypass line 80, and the recovered waste heat of the electronic component core exchanges heat with the refrigerant of the refrigerant bypass line 70 through the chiller C. That is, heat exchange is performed between the refrigerant that circulates on the refrigerant bypass line 70 and the cooling water that circulates on the first cooling water bypass line 80. Furthermore, the controller controls the first valve V1 and the second pump P2 to introduce the cooling water with the increased temperature passing through the water heating heater 22 after passing through the water-cooled condenser W to the high-voltage battery core B through the first battery heating line 30 and then to introduce the cooling water again to the indoor heating line 20 through the second battery heating line 40. Accordingly, heat exchange is performed between the refrigerant passing through the water-cooled condenser W and the cooling water passing through the water-cooled condenser W. As a result, the waste heat of the electronic component core is recovered and the recovered waste heat is transferred to the high-voltage battery core B. Accordingly, the thermal efficiency of the vehicle is heightened. In the instant case, it may be also possible to discharge the air with the increased temperature into the interior space of the vehicle using the heating core 21 for the indoor air conditioning. As a result, in the case of the second mode, the temperature of the high-voltage battery core B may be increased using the water heating heater 22, and by recovering the waste heat of the electronic component core, the thermal efficiency of the vehicle is heightened, and if necessary, the air with the increased temperature may be discharged into the interior space of the vehicle.

On the other hand, the thermal management system for a vehicle according to an exemplary embodiment of the present invention as illustrated in FIG. 1 may further include a second cooling water bypass line 90 having one end portion connected to the upstream point of the high-voltage battery core B of the battery line 10, and the other end portion connected to the downstream point of the high-voltage battery core B of the battery line 10, wherein the second cooling water bypass line 90 is connected to exchange heat with the first cooling water bypass line 80 or the refrigerant bypass line 70 through connection to the chiller C.

According to an exemplary embodiment of the present invention, the second cooling water bypass line 90 is provided. As illustrated, one end portion of the second cooling water bypass line 90 is connected to the upstream point of the high-voltage battery core B of the battery line 10, and the other end portion of the second cooling water bypass line 90 is connected to the downstream point of the high-voltage battery core B of the battery line 10 through the third valve V3. Furthermore, the second cooling water bypass line 90 is connected to the chiller C. Accordingly, the second cooling water bypass line 90 may be connected to exchange heat with the first cooling water bypass line 80 or the refrigerant bypass line 70.

On the other hand, according to the thermal management system for a vehicle according to an exemplary embodiment of the present invention, in a third mode to cool the high-voltage battery core B, the controller may be configured to control the compressor 53, the third valve V3, and the first pump P1 to introduce the refrigerant passing through the air-cooled condenser 54 to the water-cooled condenser W through the chiller C and then to introduce the refrigerant again to the air-cooled condenser 54, and to introduce the cooling water passing through the high-voltage battery core B to the chiller C through the second cooling water bypass line 90 and then to introduce the cooling water again to the high-voltage battery core B.

Figure 3:
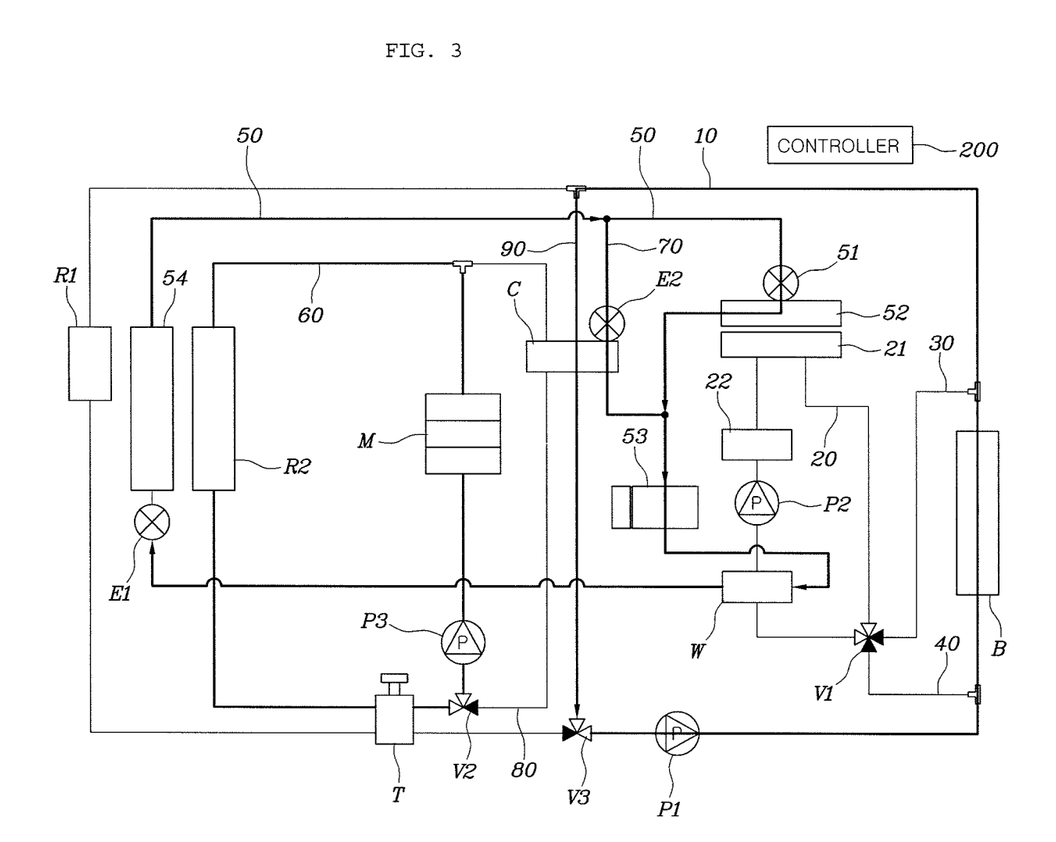

With reference to FIG. 3, the controller controls the compressor 53 to introduce the refrigerant passing through the air-cooled condenser 54 to the water-cooled condenser W through the chiller C, and then to introduce the refrigerant again to the air-cooled condenser 54. Accordingly, the refrigerant is cooled using the external air of the vehicle and then it is introduced again to the water-cooled condenser W. Furthermore, the controller controls the third valve V3 and the first pump P1 to introduce the cooling water passing through the high-voltage battery core B to the chiller C through the second cooling water bypass line 90, and then to introduce the cooling water again to the high-voltage battery core B. Accordingly, heat exchange is performed between the refrigerant of the refrigerant bypass line 70 passing through the chiller C and the cooling water of the second cooling water bypass line 90 passing through the chiller C. As a result, the cooling water of the second cooling water bypass line 90 passing through the chiller C is cooled and then is circulated, and thus the high-voltage battery core B may be cooled. In the instant case, it may be also possible to discharge the cooled air into the interior space of the vehicle using the cooling core 52 for the indoor air conditioning. As a result, in the case of the third mode, the high-voltage battery core B may be cooled, and if necessary, the cooled air may be discharged into the interior space of the vehicle.

On the other hand, according to the thermal management system for a vehicle according to an exemplary embodiment of the present invention, in a fourth mode to cool the electronic component core and the high-voltage battery core B, the controller may be configured to control the compressor 53, the first valve V1, the second valve V2, the third valve V3, the first pump P1, and the third pump P3 to introduce the refrigerant passing through the air-cooled condenser 54 to the water-cooled condenser W through the chiller C and then to introduce the refrigerant again to the air-cooled condenser 54, to introduce the cooling water passing through the high-voltage battery core B to the chiller C through the second cooling water bypass line 90 and then to introduce the cooling water again to the high-voltage battery core B, and to introduce the cooling water passing through the electronic component core again to the electronic component core after passing through the second radiator R2.

With reference to FIG. 3, the controller controls the compressor 53 to introduce the refrigerant passing through the air-cooled condenser 54 to the water-cooled condenser W through the chiller C, and then to introduce the refrigerant again to the air-cooled condenser 54. Accordingly, the refrigerant is cooled using the external air of the vehicle and then it is introduced again to the water-cooled condenser W. Furthermore, the controller controls the third valve V3 and the first pump P1 to introduce the cooling water passing through the high-voltage battery core B to the chiller C through the second cooling water bypass line 90, and then to introduce the cooling water again to the high-voltage battery core B. Accordingly, heat exchange is performed between the refrigerant of the refrigerant bypass line 70 passing through the chiller C and the cooling water of the second cooling water bypass line 90 passing through the chiller C. As a result, the cooling water of the second cooling water bypass line 90 passing through the chiller C is cooled and then is circulated, and thus the high-voltage battery core B may be cooled. Furthermore, the controller may be configured to control the second valve V2 and the third pump P3 to introduce the cooling water passing through the electronic component core again to the electronic component core after passing through the second radiator R2. Accordingly, the cooling water with the increased temperature through the recovery of the waste heat of the electronic component core is heat-dissipated in the second radiator R2 to cool the electronic component core. In the instant case, it may be also possible to discharge the cooled air into the interior space of the vehicle using the cooling core 52 for the indoor air conditioning. As a result, in the case of the fourth mode, the electronic component core and the high-voltage battery core B may be cooled, and if necessary, the cooled air may be discharged into the interior space of the vehicle.

On the other hand, in a fifth mode to cool the electronic component core and the high-voltage battery core B using the outdoor air of the vehicle, the controller may be configured to control the first valve V1, the second valve V2, the third valve V3, the first pump P1, and the third pump P3 to circulate the cooling water in the battery line 10 and the electronic component line 60.

Figure 4:
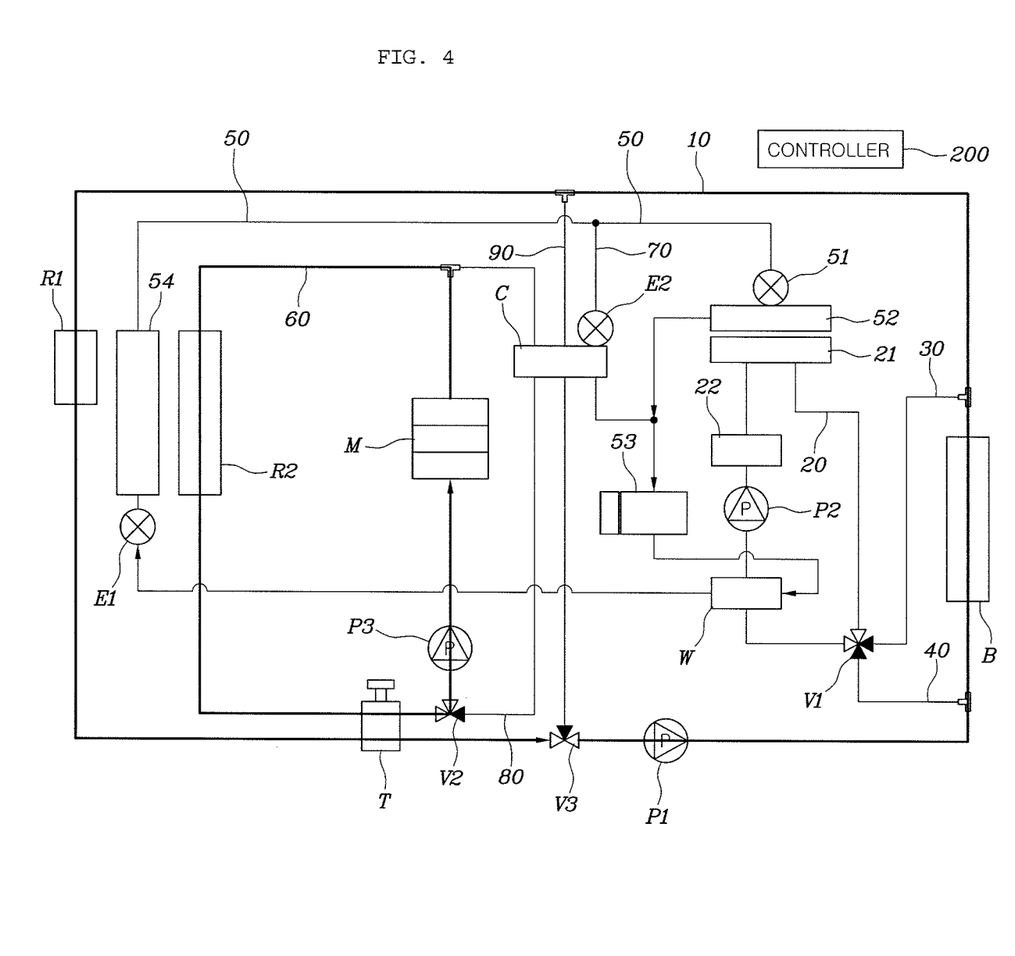

With reference to FIG. 4, the controller controls the first valve V1, the third valve V3, and the first pump P1 to circulate the cooling water in the battery line 10. Accordingly, the cooling water passing through the high-voltage battery core B to recover the waste heat of the high-voltage battery core B is heat-dissipated in the first radiator R1 to be cooled again. Furthermore, the controller controls the second valve V2 and the third pump P3 to circulate the cooling water in the electronic component line 60. Accordingly, the cooling water passing through the electronic component core to recover the waste heat of the electronic component core is heat-dissipated in the second radiator R2 to be cooled again. As a result, in the case of the fifth mode, the electronic component core and the high-voltage battery core B may be cooled using the outdoor air of the vehicle.

Figure 5:
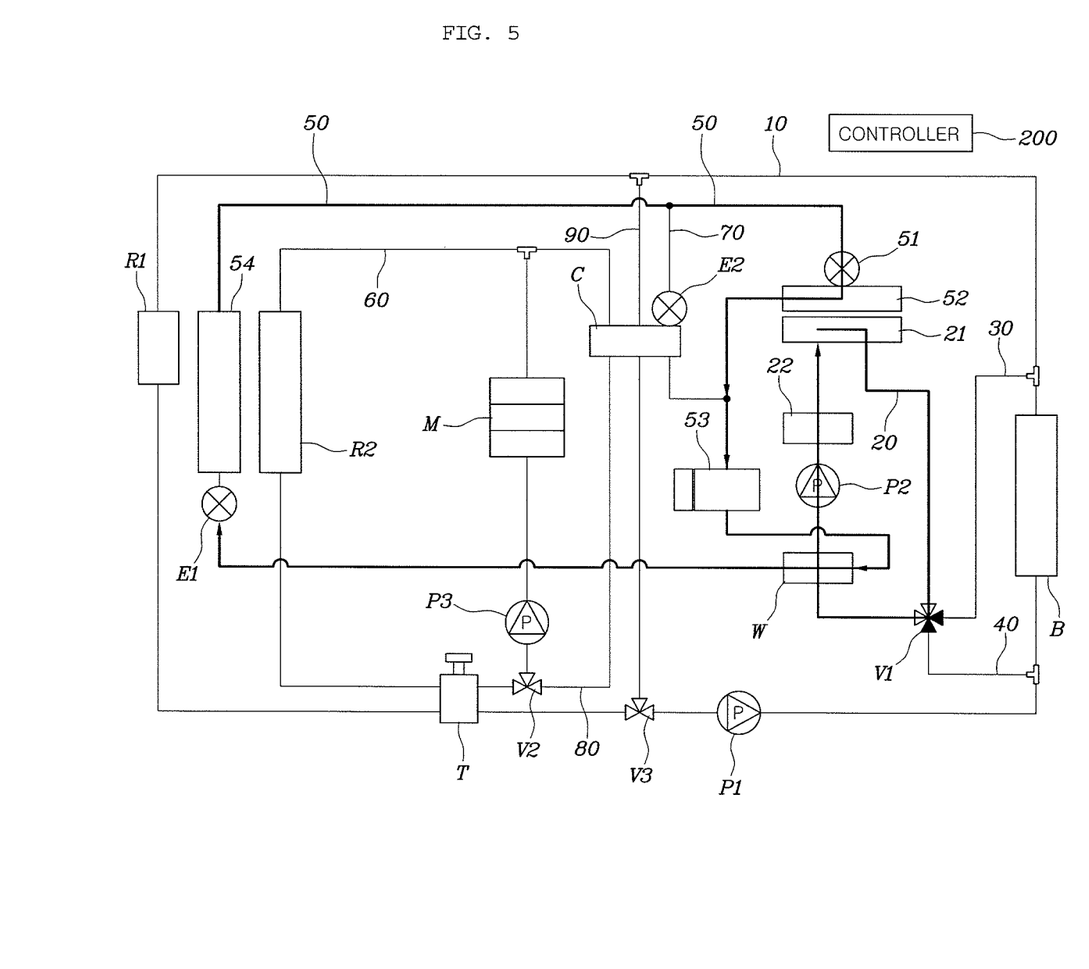

On the other hand, according to the thermal management system for a vehicle according to an exemplary embodiment of the present invention, in a sixth mode to discharge a dehumidified air into the interior space of the vehicle as shown in FIG. 5, the controller may be configured to control the compressor 53, the first valve V1, and the first pump P1 to circulate the refrigerant in the refrigerant line 50, and to circulate the cooling water in the indoor heating line 20. In the instant case, the temperature of the air passing through the cooling core 52 for the interior air conditioning is lowered, and then the temperature of the air is increased as the air passes through the cooling core 52 for the indoor air conditioning after being dehumidified, resulting in that the dehumidified air may be discharged into the interior space of the vehicle.

Furthermore, according to the thermal management system for a vehicle according to various exemplary embodiments of the present invention, the first radiator R1 may be removed from the battery line 10, and the battery line 10 may be connected to the chiller C through the second cooling water bypass line 90 to circulate the cooling water through the first pump P1. As illustrated, the first radiator R1 is removed from the battery line 10, and the battery line 10 is connected to the chiller C through the second cooling water bypass line 90. Furthermore, the cooling water may be circulated in the battery line 10 and the second cooling water bypass line 90 through the first pump P1. In the instant case, although only the second radiator R2 is used, the high-voltage battery core B may be cooled through the chiller C, and thus the layout and the overall weight of the thermal management system for a vehicle may be reduced.

Furthermore, according to an exemplary embodiment of the present invention, as illustrated in FIG. 1, a reservoir tank T may be provided to be connected to the battery line and the electronic component line to cope with a case where the volume of the cooling water is changed in accordance with the temperature change of the cooling water.

Furthermore, according to the thermal management system for a vehicle according to various exemplary embodiments of the present invention, as illustrated in FIG. 7, the first battery heating line 30 may be branched from the first valve V1 provided at the downstream point of the heating core 21 of the indoor heating line 20 and may be connected to the upstream point of the high-voltage battery core B of the battery line 10, and the second battery heating line 40 may be branched between the downstream point of the heating core 21 of the indoor heating line 20 and the upstream point of the first valve V1 and may be connected to the downstream point of the high-voltage battery core B of the battery line 10. The thermal management system may further include a third cooling water bypass line 100 having one end portion connected to the second battery heating line 40 through the fourth valve V4, and the other end portion connected to the first battery heating line 30. In the instant case, the first valve V1 and the fourth valve V4 are applied as three-way valves, and a circuit configured for replacing four-way valves may be provided.

FIG. 6 is a diagram illustrating a thermal management system for a vehicle according to various exemplary embodiments of the present invention.

In FIG. 6, the first radiator R1 and the third valve V3 are omitted from the exemplary embodiment of FIG. 1

FIG. 7 is diagrams illustrating a thermal management system for a vehicle according to various exemplary embodiments of the present invention.

In FIG. 7, the fourth valve V4 is added between the indoor heating line 20 and the first battery line 30 in the exemplary embodiment of FIG. 1

According to the thermal management system for a vehicle according to an exemplary embodiment of the present invention, it is possible to efficiently manage energy which is necessary for indoor air conditioning, cooling of electronic components, or heating and cooling of a battery in a thermal management field for a vehicle.

Because a plurality of radiators are effectively divided or integrated to be used, the heating/cooling efficiency may be maximized, and the usage amount of the refrigerant may be greatly reduced through integration of the thermal management system.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A thermal management system for a vehicle, the thermal management system comprising:
    a battery line connected to a battery core, mounted with a first radiator, and configured to make cooling water flow therein by a first pump;
    an indoor heating line connected to a heating core for indoor air conditioning, mounted with a water heating heater therein, and mounted with a second pump to make cooling water flow therein;
    a first battery heating line and a second battery heating line branched from a first valve mounted at a downstream point of the heating core of the indoor heating line and connected to an upstream point and a downstream point of the battery core of the battery line, respectively; and
    a refrigerant line mounted with a first expansion valve, a cooling core for indoor air conditioning, a compressor, and an air-cooled condenser.

2. The thermal management system according to claim 1, wherein a downstream point of the compressor of the refrigerant line and an upstream point of the water heating heater of the indoor heating line are connected to each other through a water-cooled condenser, and the refrigerant line and the indoor heating line are connected to each other to exchange heat with each other through the water-cooled condenser.

3. The thermal management system according to claim 2, wherein a second expansion valve is mounted on the refrigerant line between the air-cooled condenser and the water-cooled condenser.

4. The thermal management system according to claim 2, further including an electronic component line connected to an electronic component core, mounted with a second radiator, and configured to make the cooling water flow therein by a third pump.

5. The thermal management system according to claim 4, further including:
    a refrigerant bypass line having a first end portion connected to an upstream point of the cooling core for the indoor air conditioning of the refrigerant line, and a second end portion connected between a downstream point of the cooling core for the indoor air conditioning and an upstream point of the compressor of the refrigerant line; and
    a first cooling water bypass line having a first end portion connected to a downstream point of the electronic component core of the electronic component line, and a second end portion connected to an upstream point of the electronic component core of the electronic component line through a second valve,
    wherein the refrigerant bypass line and the first cooling water bypass line are connected to each other through a chiller, and the refrigerant bypass line and the first cooling water bypass line are connected to each other to exchange heat with each other through the chiller.

6. The thermal management system according to claim 5, wherein a third expansion valve is mounted on the refrigerant bypass line.

7. The thermal management system according to claim 5, wherein a controller is configured to control the water heating heater, the first valve, and the second pump, and
    wherein in a first mode to increase a temperature of the battery core,
    the controller is configured to control the water heating heater, the first valve, and the second pump to introduce the cooling water with an increased temperature passing through the water heating heater to the battery core through the first battery heating line, and then to introduce the cooling water again to the indoor heating line through the second battery heating line.

8. The thermal management system according to claim 5, wherein a controller is connected to the compressor, the water heating heater, the first valve, the second valve, the second pump, and the third pump, and
    wherein in a second mode to recover a waste heat of the electronic component core and to increase a temperature of the battery core,
    a controller is configured to control the compressor, the water heating heater, the first valve, the second valve, the second pump, and the third pump to introduce the cooling water passing through the electronic component core to the chiller through the first cooling water bypass line and then to introduce the cooling water again to the electronic component line,
    to introduce a refrigerant passing through the air-cooled condenser to the water-cooled condenser through the chiller and then to introduce the refrigerant again to the air-cooled condenser, and
    to introduce the cooling water with an increased temperature passing through the water heating heater after passing through the water-cooled condenser to the battery core through the first battery heating line, and then to introduce the cooling water again to the indoor heating line through the second battery heating line.

9. The thermal management system according to claim 5, further including a second cooling water bypass line having a first end portion connected to the upstream point of the battery core of the battery line, and a second end portion connected to the downstream point of the battery core of the battery line, wherein the second cooling water bypass line is connected to exchange heat with the first cooling water bypass line or the refrigerant bypass line through connection to the chiller.

10. The thermal management system according to claim 9,
    wherein a controller is connected to the compressor, the third valve, and the first pump, and
    wherein in a third mode to cool the battery core,
    the controller is configured to control the compressor, the third valve, and the first pump to introduce a refrigerant passing through the air-cooled condenser to the water-cooled condenser through the chiller and then to introduce the refrigerant again to the air-cooled condenser, and
    to introduce the cooling water passing through the battery core to the chiller through the second cooling water bypass line and then to introduce the cooling water again to the battery core.

11. The thermal management system according to claim 9,
wherein a controller is configured to control the compressor, the first valve, the second valve, the third valve, the first pump, and the third pump, and
wherein in a fourth mode to cool the electronic component core and the battery core,
the controller is configured to control the compressor, the first valve, the second valve, the third valve, the first pump, and the third pump to introduce a refrigerant passing through the air-cooled condenser to the water-cooled condenser through the chiller and then to introduce the refrigerant again to the air-cooled condenser,
to introduce the cooling water passing through the battery core to the chiller through the second cooling water bypass line and then to introduce the cooling water again to the battery core, and
to introduce the cooling water passing through the electronic component core again to the electronic component core after passing through the second radiator.

12. The thermal management system according to claim 9,
wherein a controller is configured to control the first valve, the second valve, the third valve, the first pump, and the third pump, and
wherein in a fifth mode to cool the electronic component core and the battery core using an external air of the vehicle,
the controller is configured to control the first valve, the second valve, the third valve, the first pump, and the third pump to circulate the cooling water in the battery line and the electronic component line.

13. The thermal management system according to claim 1, further including a reservoir tank connected to the battery line and the electronic component line.

14. The thermal management system according to claim 1, wherein the first battery heating line is branched from the first valve mounted at the downstream point of the heating core of the indoor heating line and is connected to the upstream point of the battery core of the battery line, and
the second battery heating line is branched between the downstream point of the heating core of the indoor heating line and an upstream point of the first valve and is connected to the downstream point of the battery core of the battery line, and
wherein the thermal management system further includes a third cooling water bypass line having a first end portion connected to the second battery heating line through a fourth valve, and a second end portion connected to the first battery heating line.

15. A thermal management system for a vehicle, the thermal management system comprising:
a battery line connected to a battery core and configured to make cooling water flow therein by a first pump;
an indoor heating line connected to a heating core for indoor air conditioning, mounted with a water heating heater therein, and mounted with a second pump to make cooling water flow therein;
a first battery heating line and a second battery heating line branched from a first valve mounted at a downstream point of the heating core of the indoor heating line and connected to an upstream point and a downstream point of the battery core of the battery line, respectively;
a refrigerant line mounted with a first expansion valve, a cooling core for indoor air conditioning, a compressor, and an air-cooled condenser; and
a first cooling water bypass line having a first end portion connected to a downstream point of an electronic component core of an electronic component line connected to the electronic component core, and a second end portion connected to an upstream point of the electronic component core of the electronic component line through a second valve.

16. The thermal management system according to claim 15, wherein the electronic component line is mounted with a radiator, and configured to make the cooling water flow therein by a third pump.

17. The thermal management system according to claim 15, further including:
a second cooling water bypass line having a first end portion connected to the upstream point of the battery core of the battery line, and a second end portion connected to the downstream point of the battery core of the battery line, wherein the second cooling water bypass line is connected to exchange heat with the first cooling water bypass line or the refrigerant bypass line through connection to the chiller,
wherein the battery line is connected to the chiller through the second cooling water bypass line to circulate the cooling water through the first pump.

18. The thermal management system according to claim 15, further including a reservoir tank connected to the electronic component line.

* * * * *